(12) United States Patent
Wertheimer

(10) Patent No.: US 9,479,451 B1
(45) Date of Patent: Oct. 25, 2016

(54) ALLOCATING RESOURCES

(71) Applicant: Google Inc., Mountain View, CA (US)

(72) Inventor: David L. Wertheimer, South San Francisco, CA (US)

(73) Assignee: Google Inc., Mountain View, CA (US)

( * ) Notice: Subject to any disclaimer, the term of this patent is extended or adjusted under 35 U.S.C. 154(b) by 330 days.

(21) Appl. No.: 14/057,597

(22) Filed: Oct. 18, 2013

(51) Int. Cl.
| | |
|---|---|
| *G06F 15/173* | (2006.01) |
| *H04L 12/911* | (2013.01) |
| *H04L 12/24* | (2006.01) |
| *H04W 28/16* | (2009.01) |
| *G06Q 10/06* | (2012.01) |
| *G06Q 30/08* | (2012.01) |
| *G06Q 30/02* | (2012.01) |
| *G06Q 40/04* | (2012.01) |

(52) U.S. Cl.
CPC ............. *H04L 47/748* (2013.01); *G06Q 10/06* (2013.01); *G06Q 10/0631* (2013.01); *G06Q 30/0275* (2013.01); *G06Q 30/08* (2013.01); *G06Q 40/04* (2013.01); *H04L 41/5029* (2013.01); *H04L 41/5054* (2013.01); *H04L 47/781* (2013.01); *H04W 28/16* (2013.01)

(58) Field of Classification Search
CPC ............. H04L 41/5054; H04L 47/748; H04L 47/781; H04L 41/5029; G06Q 10/06; G06Q 10/0631; G06Q 30/08; G06Q 30/0613; G06Q 30/0275; G06Q 40/04; G06Q 30/0601; H04W 28/16
USPC .................. 709/217, 219, 223, 224, 226; 705/14.71, 26.3, 37, 26.1, 7.25, 7.12; 718/104
See application file for complete search history.

(56) References Cited

U.S. PATENT DOCUMENTS

| | | | |
|---|---|---|---|
| 8,533,103 B1 * | 9/2013 | Certain | G06Q 10/06 705/35 |
| 2004/0111308 A1 | 6/2004 | Yakov | |
| 2006/0069621 A1 * | 3/2006 | Chang | G06F 9/505 705/26.1 |
| 2006/0149652 A1 * | 7/2006 | Fellenstein | G06Q 30/08 705/35 |
| 2008/0244607 A1 * | 10/2008 | Rysin | G06Q 30/06 718/104 |
| 2009/0265205 A1 * | 10/2009 | Stinchcombe | G06Q 10/06 705/37 |
| 2010/0076856 A1 | 3/2010 | Mullins | |

(Continued)

OTHER PUBLICATIONS

Stokely et al., "Using a Market Economy to Provision Compute Resources Across Planet-wide Clusters" Proceedings for the International Parallel and Distributed Processing Symposium 2009, IEEE, pp. 1-8.

*Primary Examiner* — Liangche A Wang
*Assistant Examiner* — Johnny Aguiar
(74) *Attorney, Agent, or Firm* — Fish & Richardson P.C.

(57) ABSTRACT

Methods, systems, and apparatus, including computer programs encoded on a computer storage medium, for allocating resources. In one aspect, a method includes receiving, from a resource requester, a first request statement specifying a first computing resource, a first bid for the first computing resource, a total quantity of the first resource requested by the resource requester; and a minimum quantity of the first resource that the resource requester is willing to accept. A second request statement can be received from the resource requester that specifies a second bid for the second computing resource and a condition statement specifying that the second bid is only valid if the first computing resource will be allocated to the resource requestor. A determination can be made that allocation of the second computing resource and at least the minimum quantity of the first resource to the resource requestor will achieve a resource allocation objective.

17 Claims, 5 Drawing Sheets

(56) References Cited

U.S. PATENT DOCUMENTS

2012/0290460 A1* 11/2012 Curry, Jr. ............... G06Q 30/08
705/37

2014/0067496 A1* 3/2014 Buswell ................. G06Q 30/08
705/14.4

2014/0180862 A1* 6/2014 Certain ................. G06Q 30/00
705/26.3

* cited by examiner

ALLOCATING RESOURCES

BACKGROUND

Cloud computing and other distributed computing systems allow resource providers to offer computing resources for use by others over a network. For example, a resource provider may host a web-based application for a business, and enable use of the web-based application over the Internet. Some companies have organizational distributed computing systems in which employees or departments may be able to request and use computing resources of the distributed computing system.

SUMMARY

This specification describes technologies relating to resource allocation.

In general, one innovative aspect of the subject matter described in this specification can be embodied in methods that include the actions of receiving, from a resource requester, a first request statement specifying: a first computing resource; a first bid for the first computing resource, the first bid specifying a value that the resource requester is willing to pay to be allocated the first computing resource; a total quantity of the first resource requested by the resource requester; and a minimum quantity of the first resource that the resource requester is willing to accept; receiving, from the resource requester, a second request statement specifying a second computing resource different from the first computing resource and a second bid for the second computing resource, the second bid specifying a value that the resource requester is willing to pay to be allocated the second computing resource, the second request statement including a condition statement specifying that the second bid is only valid if the first computing resource will be allocated to the resource requestor; identifying a resource allocation objective for allocation of the first computing resource and the second computing resource among resource requestors; determining, based on a set of request statements that includes the first request statement, that allocation of the second computing resource and at least the minimum quantity of the first resource to the resource requestor will achieve the resource allocation objective; and in response to the determination, providing data that causes the first computing resource and the second computing resource to be allocated for use by the resource requester. Other embodiments of this aspect include corresponding systems, apparatus, and computer programs, configured to perform the actions of the methods, encoded on computer storage devices.

These and other embodiments can each optionally include one or more of the following features. The resource allocation objective can include one of maximizing revenue from the bid values, minimizing a number of rejected request statements, or maximizing a number of resources allocated. Aspects can further include receiving, from the resource requester, a budget constraint specifying a maximum total amount the first requester is willing to pay for computing resources. Determining that allocation of the first computing resource and the second computing resource to the resource requester can include determining that allocation of the first computing resource and the second computing resource at a price that is within the budget constraint will achieve the resource allocation objective.

Allocating the resources can include inputting the request statements into a mixed integer programming problem that allocates the resources to resource requesters based on the resource allocation objective and the input. The value of the first bid can specify a premium value that is above a listed price for the first resource.

Aspects can further include providing, to the resource requester, data specifying a suggested bid for the first computing resource. The suggested bid can specify a value for the resource requester to provide in a subsequent bid for the first resource. Aspects can further include receiving, from the resource requester, an updated bid for the first computing resource. The updated bid can have a value that is based on the suggested bid. The second request statement can include a second condition statement that specifies that the second bid is only valid if a portion of a group of resources will be allocated to the resource requester.

Particular embodiments of the subject matter described in this specification can be implemented so as to realize one or more of the following advantages. Finite computing resources can be allocated to requesting users in a manner that facilitates efficient and effective use of the computing resources. When bids are used to allocate computing resources, conditional requests that condition the bid for a resource on the acceptance of another bid for a resource can enable a requesting user to only compete for a particular resource if that requesting user has already been allocated another specified resource. Resource requesters can submit flexible bids that may allow the requester to receive less than a full amount of desired computing resources. Resources can be allocated such that budget constraints of resource requesters are not exceeded.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A system allocates resources, such as a set of computing resources, based on resource requests received from entities that desire to use the resources, for example using mixed integer programming. A request can include or be in the form of a request statement that specifies one or more resources being requested and a bid for the one or more resources being requested. The bid may specify a value that the entity that submitted the request statement is willing to pay to be allocated and/or use the one or more resources. For example, a resource requester may want to use twenty processor cores and three hundred gigabytes of storage for a two week period. In this example, the resource requester may submit to the system a request statement (or multiple request statements) specifying the number of cores requested and storage requirements. The request statement in this example may also include a bid that specifies a value that the requester will pay to be allocated and/or use the requested cores and storage.

A request statement received from a requester can be conditioned on fulfillment of another request statement. For example, an organization may need computing resources in a particular city, but only if the organization can also obtain computing resources in another city. In this example, the requester can condition the bid for the computing resources in the particular city on the requester being allocated the computing resources in the other city. Thus, the requester's bid for the computing resources in the particular city is only valid if the requester has been allocated the computing resources in the other city. Other example conditions are described below.

A request statement can also specify a flexible amount of resources. For example, a requester may want five hundred cores, but may be willing to accept four hundred cores if the requester's bid does not win the full five hundred. In this example, the requester may submit a request statement that specifies a total quantity of cores requested and a minimum quantity of cores that is acceptable in the event that the total quantity of cores is not going to be allocated to the requester.

The system can allocate a set of resources based on request statements, an allocation objective, and optionally other constraints or inputs. The allocation objective can specify an objective of the allocation, such as to maximize revenue, maximize resource utilization, or minimize the number of rejected bids. Resource allocation objectives can be stored in a data store, such as a resource requests data store. The system can generate a mixed integer programming problem based on the inputs and evaluate the problem to allocate the resources. In some implementations, the problem can be evaluated multiple times, and resource requesters may be able to adjust their bids after each iteration.

Figure 1:
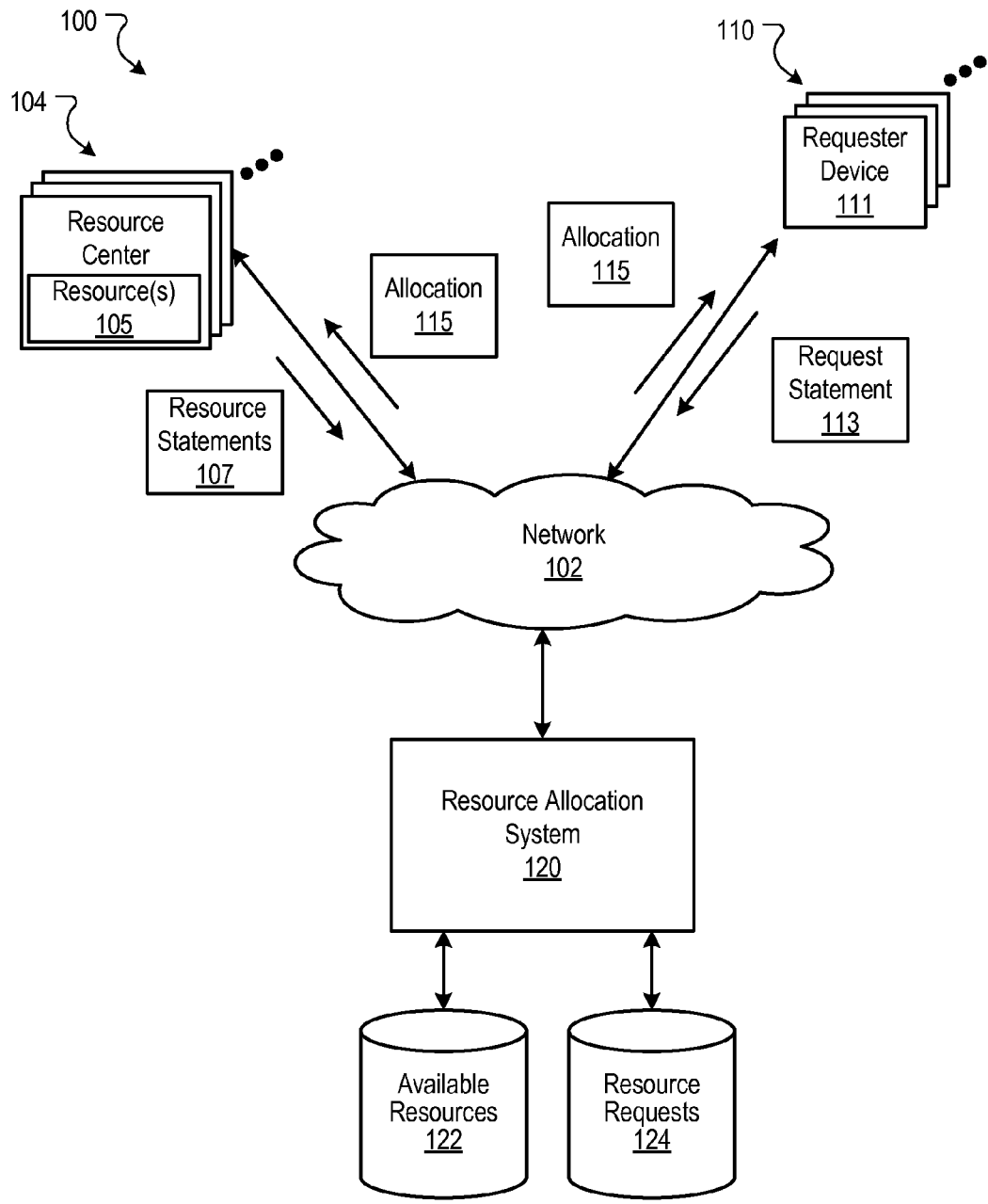
FIG. 1 is a block diagram of an example environment in which a resource allocation system allocates resources.

FIG. 1 is a block diagram of an example environment 100 in which a resource allocation system 120 allocates resources. A data communication network 102, such as a local area network (LAN), wide area network (WAN), the Internet, or a combination thereof, connects resources 105 of resource providers 104, devices 111 of resource requesters 110, and a resource allocation system 120.

A resource provider 104 is an entity, such as an individual or organization, that provides computing resources 105 for use over a network. For example, a resource provider 104 may be a cloud computing provider that provides the use of computing resources over the Internet. A resource provider 104 may also be an IT group (e.g., within a company or external IT provider) that makes resources available to individuals or groups within an organization by way of the network 102. A resource provider 104 may also be a third party broker that allocates resources 105 from one or multiple cloud computing providers.

The resources 105 can include any type of computing resource that is accessible over a network. For example, the resources 105 may include processor cores, memory, data storage, network devices, and/or software applications. The resources 105 can be provided in discrete units or in groups, e.g., a group of processors and memory. The resources 105 can also be distributed across multiple locations. For example, the resources 105 provided by a resource provider 104 may be distributed across multiple resource centers that are located in different parts of the world.

To make the resources 105 available to others, the resource providers 104 can provide resource statements 107 to the resource allocation system 120. The resource statements 107 include data identifying available resources, a time period for which the resources are available, a geographic location of the resource, and optionally a listed price or minimum price for use of the resources. A listed price for a resource may be a price at which the resource can be obtained absent competition for the resource. A minimum price for a resource may be a minimum price at which the resource provider is willing to allocate the resource to an entity. For example, a resource statement 107 may specify that a resource provider 104 has one thousand processor cores available for the month of May with a cost of fifty cents per processor per day (or some other amount). The price may also be specified for a group of resources. For example, a resource provider 104 may specify that a group of twenty processors and one thousand gigabytes of storage located in Atlanta, Ga. is available for a two week period for a minimum price of fifty dollars per day (or some other amount).

A resource statement 107 may also include performance characteristics for a resource 105. For example, a resource statement 107 may specify the speed of a processor core. The performance characteristics may also be in relation to other resources. An example performance characteristic for a processor core may specify that the core is within eight milliseconds of another processor core.

Resource requesters 110, such as individuals and organizations, can request resources by providing request statements 113 to the resource allocation system 120. The request statements 113 can include data specifying one or more resources that the resource requester 110 is requesting to use. A request statement 113 may also include a time period over which use of the resource is being requested, a bid that specifies a value that the resource requester 110 is willing to pay for the resource, a condition statement that specifies conditions on which the bid depends, and/or a quantity of the resource desired. The bid can specify an absolute value that the requester is willing to pay or an amount over a listed or minimum price for a resource. The resource requester 110 may also provide an overall budget that specifies a maximum amount the resource requester 110 is willing to pay over a specified period of time for resources requested through multiple request statements 113.

A list of available resources may be provided to potential resource requesters 110 so that the resource requesters 110 can determine for which, if any, resources the requesters want to submit a bid. For example, the resources allocation system 120 can provide a user interface that specifies the available resources and their characteristics (e.g., speed, location, listed price, etc.) prior to allocating the resources. The user interface can also specify a listed or minimum price for each of the available resources. The resource requesters 110 can access the user interface, for example over the network 102, and submit request statements 113 for a resource or a group of resources that are specified in the user interface.

When creating request statements 113, a requester can specify a condition statement that expresses interdependencies between two to more resource requests and their respective request statements 113. This enables resource requesters 110 to condition a bid for a resource on the allocation of another resource to the resource requester 110. For example, an organization may want to use a particular number of processors to run an application, but only if the organization can also acquire the use of a particular amount of data storage to store results of the application. The organization may use a condition statement to condition the bid for the processors on being allocated the data storage, and vice versa. A condition statement can also be used to define a group of bids that all must win (e.g., result in allocation of the resources corresponding to the bids) for any of the resources to be allocated to a resource requester 110.

A condition statement can be used to condition a bid for a resource on a requester not being allocated another resource. For example, an organization may submit a bid for two different resources, even though the organization may want only one of two resources. If the organization is allocated one of the two resources, then the bid for the other resource can be considered canceled, ineligible, or void, so that the organization will not be allocated the second resource.

A condition statement can also be used to define a partial group of resources. For example, an organization may want two resources out of a group of ten available resources. If two of the resources are allocated to the requester, the requester's bid (e.g., bids for the other eight resources or a single bid that the requester has provided for any of the ten resources) may be canceled.

A condition statement can also be used to specify a range in the number of resources requested or in the number of groups of resources requested. For example, a resource requester 110 may want to use between seven and ten distinct groups of data storage systems to provide a desired amount of redundancy. In this example, the bid for each group of data storage systems can be conditioned on the resource requester 110 being allocated between seven and ten of the groups of data storage systems for which the resource requester 110 submitted a request statement. Or, a single request statement may specify the ten groups of data storage systems and include a condition statement that specifies that the request statement is only valid if some amount between seven and ten of the data storage systems inclusive will be allocated to the resource requester 110.

A condition statement can specify a particular amount or range of resources in particular locations. For example, a resource requester 110 may want to use between three and five processor core groups in Atlanta and between six and eight groups of processor core groups in Kansas City. The resource requester 110 may submit request statement that specifies the range of three to five processor core groups in Atlanta and a request statement that specifies the range of six to eight processor core groups in Kansas City. One or both request statements may include a condition statement that conditions the validity of the request statement on the other request statement being fulfilled.

For purposes of example, assume that a set of resources includes, among other resources, ten processor cores and each processor core may differ in speed, location or some other characteristic. A resource requester may want to use two of the ten processor cores. In this example, if the resource requester is willing to accept any of the cores despite the variation in the characteristics of the processor cores, the resource requester may submit a request statement that includes a bid for a partial group of any two of the ten processor cores. The bid for this partial group may remain valid as long as the bid is competitive for two of the processor cores (e.g., until the requestor obtains two cores, or the user is no longer able to obtain two cores). The bid for the partial group may be canceled or become inactive if the requester is allocated two of the processor cores or if the requester will not be allocated two of the processor cores, e.g., if only one processor core remains unallocated and the requester has not yet been allocated another processor core.

A request statement 113 can include a total desired quantity of a requested resource and/or a minimum quantity that will be accepted by the requester. The minimum quantity can be an amount less than the total desired quantity. By specifying a flexible quantity that includes a range of quantities based on a minimum quantity and a total desired quantity, the probability that the requester will be allocated some quantity of the resource may be improved. For example, an organization may want one thousand gigabytes of storage for a project, while five hundred gigabytes would still be helpful if it cannot obtain the total amount of storage. In this example, the organization could submit a request statement with a minimum quantity of five hundred gigabytes and a total quantity of one thousand gigabytes. If the bid submitted by the requester is sufficient to win a quantity of storage between the minimum quantity and the total quantity, e.g., seven hundred gigabytes, that quantity may be allocated to the organization. Thus, even though the bid was not high enough to win the total quantity desired by the requester, the requester was still able to obtain more than the minimum quantity.

In some implementations, bids are accepted for abstract computing units, rather than discrete computing resources. A computing unit may specify or correspond to a particular amount of computing power. For example, a computing unit may be equivalent to one processor, one gigabyte of RAM, and one hundred gigabytes of data storage. Each resource requester 110 can submit a bid for a particular number of computing units, and computing units can be allocated in a manner similar to discrete computing resources.

The resource allocation system 120 allocates resources, such as the available resources specified by resource statements 107, to resource requesters 110 based on the request statements 113 received from the resource requesters 110. The resource allocation system 120 includes an available resources data store 122 that stores data regarding resources that are available to be allocated. The data stored in the available resources data store 122 is based on the resource statements 107 received from the resource providers 104. For example, the available resources data store 122 may include data identifying each available resource, or available group of resource, and for each resource or group, data identifying a time period for which it is available and/or a minimum bid or listed price for the resource or group of resources.

The resource allocation system 120 also includes a resource requests data store 124 that stores data regarding requested resources. The data stored in the resource requests data store 124 is based on request statements 113 received from resource requesters 110. For each request statement, the resource requests data store 124 can also include data identifying the resource requester 110 that submitted the request, one or more resources identified in the request, a bid, any optional condition statements, and/or a quantity of the resource(s) requested.

In some implementations, the resource allocation system 120 allocates the available resources using a mixed integer linear programming problem. A mixed integer linear programming problem typically includes a linear function that should be maximized or minimized subject to a set of constraints. For example, the linear function may be based on a resource allocation objective for the available resources. Example allocation objectives include allocating the resources to maximize the revenue or profit generated by the allocation, to maximize the number of resources allocated, to minimize the number of rejected request statements, and to minimize the amount of stranded resources. This document describes allocating resources using a mixed integer linear programming problem, but other allocation techniques can also be used (e.g., integer linear programming, combinatorial auctions, clock auction, and linear relaxation).

An example objective function for maximizing revenue for example resources "$R_1$" and "$R_2$" is shown in Objective Function (1) below, where "$B_1$" is the amount that would be paid if the corresponding bid for "$R_1$" wholly wins and "$B_2$" is the amount that would be paid if the corresponding bid for "$R_2$" wholly wins:

$$\text{Objective Function: Maximize } B_1 + B_2 \tag{1}$$

In this example objective function, the winning bids are the highest bids for the two resources. The objective function may be much more complex than that presented above in Objective Function (1). For example, when resources can be split into multiple units (e.g., 1000 GB split into two sets of 500 GB) and split over multiple time periods, the objective function can specify multiple different objectives to be achieved, and the objectives may vary over time.

The other inputs to the resource allocation system 120 can make up variables and a set of constraints for the mixed integer programming problem. For example, each bid for a particular resource or for a particular group of resources can be considered a variable that may be inserted into the allocation objective function during the evaluation process. The quantity and time periods requested for a resource or group of resources are also variables that can be inserted into the allocation objective function during the evaluation process. For example, consider a set of storage space of one hundred gigabytes that is available for a two week period. A first requester may want fifty gigabytes for the first week, while second requester may want one hundred gigabytes for both weeks. The resource allocation system 120 can evaluate both bids, in conjunction with other constraints and resource allocations, to determine how to allocate the data storage between the two requesters over the two week period.

The resource allocation system 120 can generate a set of constraints for the mixed integer programming problem based on the request statements 113 received from the resource requesters 110 and the resource statements 107 received from the resource providers 104. For example, the availability of a resource, as specified by a resource statement 107, can provide several of the constraints. In a particular example, the maximum quantity of the resource may be one constraint; an available time period for the resource may be another constraint; and the minimum price for the resource may make up another constraint.

A bid for a resource may also be the source of several constraints. The bid value itself is a constraint. For example, the bid value may represent a maximum value that a resource requester 110 is willing to pay for a resource. Any other conditions placed upon the bid, such as a time period, quantity or range of quantity, interdependency conditions, and geographic preferences may also be constraints on the mixed integer programming problem. A budget for a particular resource requester 110 can also be a constraint.

The resource allocation system 120 can evaluate the mixed integer programming problem to identify a resource allocation such that the allocation objective is achieved and that each of the constraints are met. For example, if the allocation objective is to maximize revenue, the resource allocation system 120 may determine an allocation such that the revenue is the highest with each constraint being met. In some implementations, this solution may not necessarily be the optimal solution, for example due to processing or time limitations on the resource allocation system 120. Instead, the resource allocation system 120 may select an allocation from among a finite set of allocations based on the allocation objective and the constraints.

In some implementations, the resource allocation output by the resource allocation system 120 is required to meet each constraint in the set of constraints, which can include conditional statements provided with a bid for a resource. For example, each constraint must be met even if the resulting allocation has negative impact on the allocation objective (e.g., relative to a potential allocation that does not meet the constraints). Consider an example in which a condition statement conditions a bid for a resource on another resource being allocated to the same resource requester and the objective is to maximize revenue. If the total revenue is maximized by allocating one of the resources to another requester, then neither resource may be allocated to the resource requester, even if the conditional bid for one of the resources is a highest bid for that resource.

In some implementations, the resource allocation must also meet a budget provided by a resource a requester 110. The budget may specify the maximum total amount that the resource requester is willing to pay for computing resources. For example, the resource requester may submit bids for two resources, and a total budget to not be exceeded. The resource allocation system 120 can generate a budget constraint for the mixed integer programming problem to ensure that the budget is not exceeded by any allocation of the two resources to the resource requester.

In some implementations, the resource allocation is determined based, at least in part, on one or more request statements that request a flexible quantity of the resource. Specifying a flexible quantity, such as minimum and total desired quantities for a resource, gives a resource requester a better chance of receiving some allocation of the resource. For example, consider a finite one hundred processor cores made available by a resource provider in California and a resource allocation to maximize revenue. If two requesters bid on the processor cores, with requester A bidding $100 dollars/core for fifty cores, and requester B bidding $90/core for sixty cores. In this example, requester B will not be allocated any processor cores because fifty of the cores will be allocated to requester A based on the bid of $100/core, which will leave only fifty available cores. Since requester B requested sixty cores, there will not be enough available cores to fulfill the request from requester B. However, if requester B's request statement includes a minimum acceptable number of cores, such as forty cores, the remaining fifty cores would have been allocated to requester B. Thus, if allocation of the minimum quantity meets the allocation objective, while allocation of the maximum quantity does not meet the allocation objective, the other requester may still receive an allocation between the minimum quantity and the maximum quantity specified by the request statement.

The resource allocation system 120 can provide resource allocation data 115 to the resource requesters 110 and/or to the resource providers 104. The resource allocation data 115 for a resource requester 110 may include data specifying what resources the resource requester 110 was allocated and the winning bid for each of the allocated resources. Similarly, the resource allocation data 115 for a resource provider 104 may include data specifying which of its resources were allocated and to what requester the resource(s) were allocated.

Figure 2:
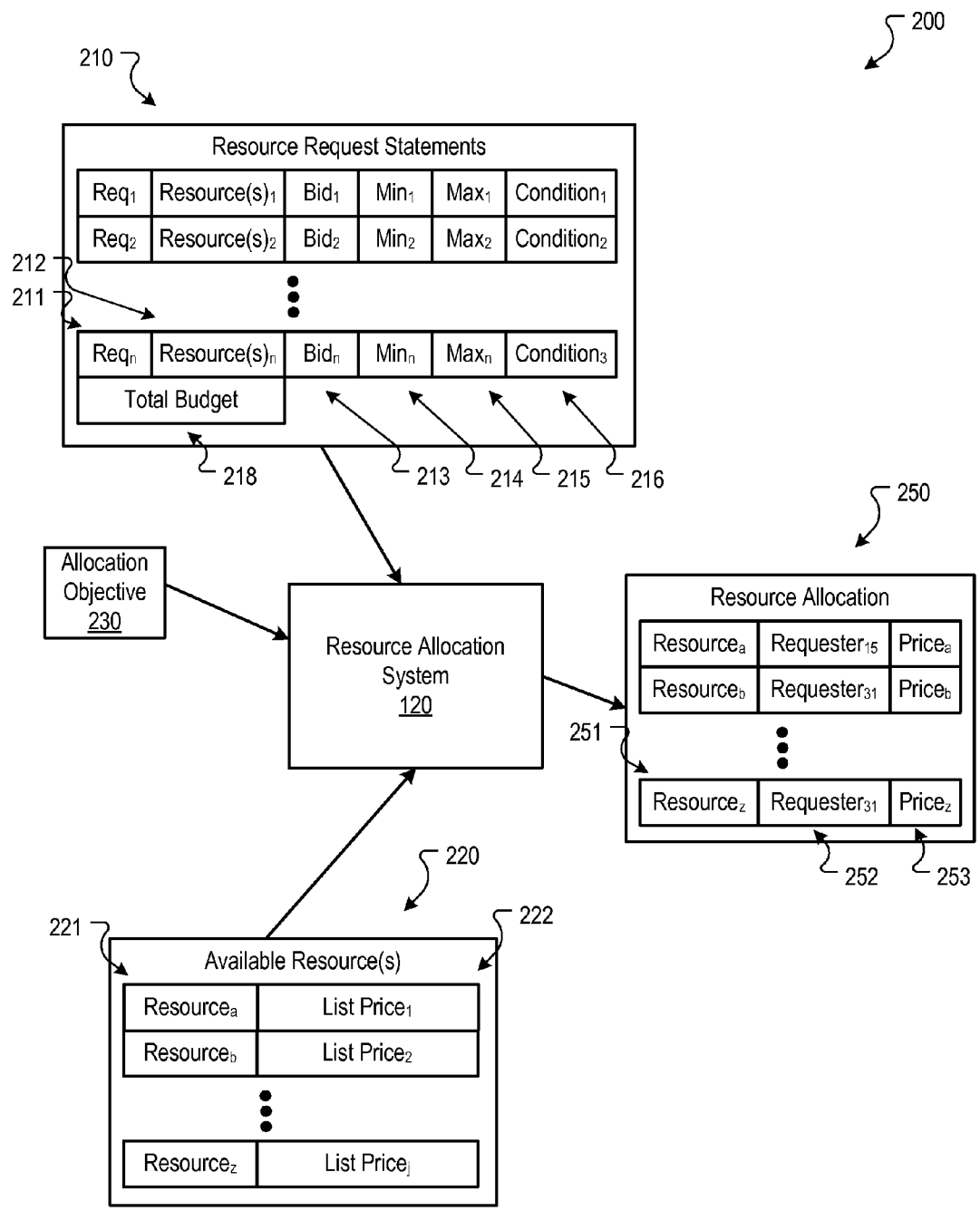
FIG. 2 is a block diagram of example inputs and outputs of an auction subsystem.

FIG. 2 is a block diagram 200 depicting example inputs and outputs of the resource allocation system 120. Example inputs to the resource allocation system 120 include request statements 210 for a particular resource requester. Each of the example request statements 210 includes a request identifier 211, such as an identification code, data specifying one or more resources 212 that are the subject of the request, a bid 213, a minimum quantity 214 of the resource(s), a maximum quantity 215 of the resource(s), and optionally one or more condition statements 216.

The data specifying the resource(s) 212 can specify a discrete resource, such as a processor, or a group of resources, such as a number of processors and an amount of memory. For a group, the quantities 214 and 215 can specify desired quantities of the group. The minimum quantity 214 of a request statement specifies the minimum number of the resource(s) 212 that the resource requester that submitted the request statement will accept. Similarly, the maximum quantity 215 of a request statement specifies the maximum number of the resource(s) 212 that the resource requester that submitted the request statement is requesting. If the resource requester wants a particular quantity of resources, rather than a flexible range, the resource requester can set both the minimum quantity 214 and the maximum quantity 215 to the particular quantity.

As described above, the bid 213 specifies the value that the resource requester will pay to be allocated the resource(s) 212. This value may be expressed in terms of dollars, credits, or a value above a listed or minimum bid value for use of the resource(s) 212. For example, a resource requester may specify a particular dollar amount that the requester is willing to pay, or a dollar amount above a minimum price specified by the resource provider. For an IT department internal to an organization, a resource requester may bid in resource allocation units rather than dollars. For example, each individual or group within the organization may be allocated a particular number of resource allocation units in which they can use to bid for resources.

The condition statements 216 can be used to express interdependencies between the request statements. For example, the request "REQ$_1$" may include a condition statement "Condition$_1$" that conditions its bid "BID$_1$" on the bid "BID$_2$" for request "REQ2" being sufficient to have the resource "Resource$_2$" allocated to the resource requester. A total budget amount 218 can also be specified for the resource requester. This budget amount 218 specifies a value that to not be exceeded by the bids made by the resource requester.

Although request statements are depicted for one resource requester in FIG. 2, the resource allocation system 120 can receive request statements from multiple requesters and allocate available resources to one or more of the requesters based on the request statements, other inputs, and constraints.

A set of resource statements 220 can be provided to the resource allocation system 120, for example by a particular resource provider. Each of the resource statements 220 can identify one or more available resources 221 and specify a listed price 222 or minimum bid price for each resource(s) 221. The listed price 222 for a resource 221 may be a minimum price at which the resource provider is willing to allow another to use the resource 221. The request statements 220 can also include additional data, such as the geographic location of the resource and/or a time period during which the resource is available.

Another example input to the resource allocation system 120 is an allocation objective 230. The allocation objective 230 specifies a parameter and a goal value for the parameter. The goal value can be, for example, an absolute value, such as an integer or another number, or a relative value, such as a maximum value that can be achieved based on other inputs and constraints. For example, the goal value can be specified by specifying that the value of the parameter is to be maximized or minimized by the allocation of the resources. For example, the allocation objective may specify that the parameter of revenue is to be maximized, the parameter of the number of resources allocated is to be maximized, the parameter of the number of rejected request statements is to be minimized, or the parameter of the amount of stranded resources is to be minimized. For purposes of this document, a stranded resource is a resource that remains unallocated following allocation of the resources.

The resource allocation system 120 can allocate the resources 221 based on the allocation objective 230, the request statements 210, and any constraints on the resources 221, such as the listed price for the resources. The resource allocation system 120 can provide, as an output, data specifying the resource allocation 250. This data 250 can include, for each allocated resource, data identifying the resource 251, data identifying a resource requester 252 that has been allocated the resource, and a price 253 to be paid for allocation of the resource.

Figure 3:
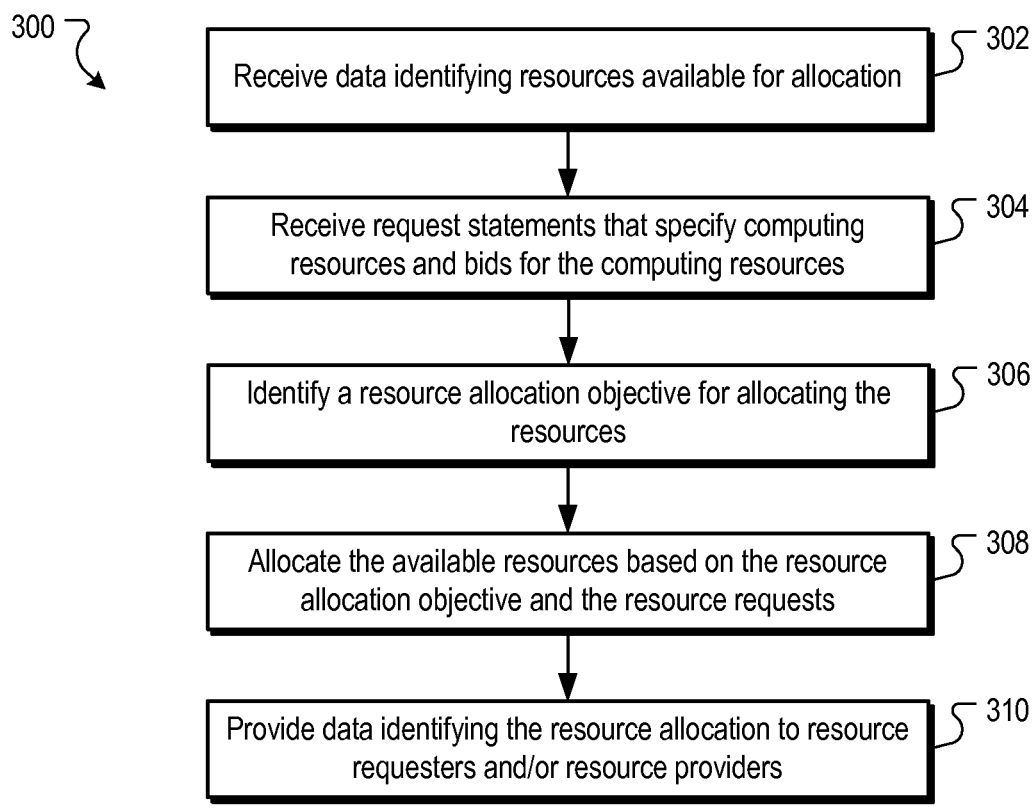
FIG. 3 is a flow chart of an example process for allocating resources.

FIG. 3 is a flow chart of an example process 300 for allocating resources. Operations of the process 300 can be implemented, for example, by a data processing apparatus, such as the resource allocation system 120 of FIG. 1. The process 300 can also be implemented by instructions stored on computer storage medium, where execution of the instructions by a data processing apparatus cause the data processing apparatus to perform the operations of the process 300.

Data identifying resources for allocation are received (302). In some implementations, the data identifying the resources are received from resource providers. For example, resource providers 104 may provide, to a resource allocation system 120, resource statements 107 that each identifies a resource or a group of resources that the resource provider 104 will make available to others. As described above, each resource statement can identify the subject resource (e.g., the resource that will be made available), a list or minimum price that the resource provider 104 is willing to accept for use of the resource, a time period during which the resource will be made available, and/or a geographic location at which the resource is located. Other data regarding the resource can also be provided in the resource statements, such as data speed, bandwidth, manufacturer, compatibility with other resources, etc. The resource allocation system 120 can store the data identifying the available resources in the available resources data store 122 and use the data to allocate the resources.

Request statements 113 that each specifies a requested resource or group of resources and a bid for the requested resource(s) are received (304). In some implementations, the request statements 113 are received from resource requesters. For example, resource requesters 110 may provide to the resource allocation system 120 request statements 113 that specify the requested resources and bids for the requested resources. As described above, a request statement 113 can specify a quantity of the resource desired (e.g., minimum and/or maximum), a condition statement specifying a condition on the bid, a time period during which the resource is desired, a geographic location for the desired resource, any budget constraints the resource requester 110 may have, and/or other data regarding the resource. The resource allocation system 120 can store the request statements in the resource requests data store 124 and use the data to allocate the available resources to the resource requesters 110.

A resource allocation objective for allocation of the resources is identified (306). An operator, system designer, or other entity associated with the resource allocation system 120 can specify an allocation objective for the available resources, for example, based on business goals or considerations. In some instances, the operator's business goal may be to maximize revenue or profit. In such instances, the operator may utilize an objective function specifying that the available resources are to be allocated such that revenue or profit is maximized. In other instances, the operator's business goal may be to fulfill as many requests as possible independent of whether such a business goal will result in maximized revenues or profits. In such instances, the operator may identify an objective function specifying that the available resources are to be allocated in a manner that minimizes the number of request statements 113 that are rejected, or that ensures fewer than a threshold number (or portion) of the requests statements 113 are rejected. In some implementations, the operator can identify an objective function by selecting from available objective functions presented through a user interface provided by the resource allocation system 120. In some implementations, the resource allocation objective may be identified from a data store.

The available resources are allocated to the resource requesters 110 based on the resource allocation objective and the resource requests (308). In some implementations, the resource allocation system 120 generates a mixed integer programming problem based on resource allocation objective, the resource statements, and the request statements. The resource allocation system 120 can evaluate the mixed integer programming problem to determine a resource allocation that achieves the allocation objective while meeting the constraints specified by the resource statements and the request statements. An example process for generating and evaluating a mixed integer programming problem is illustrated in FIG. 4 and described below.

Data identifying the resource allocation are provided to the resource requesters 110 and/or the resource providers 104 (310). The resource allocation system 120 may provide to each resource provider 104 data identifying which of its resources have been allocated, the winning bid for each allocated resource, and the requester to whom each resource has been allocated. Similarly, the resource allocation system 120 may provide to each resource requester 110 data identifying which resources have been allocated to the requester, the winning bid price for the resource, and which resource provider 104 will provide the resource to the resource requester.

Data can also be provided that causes computing resources that have been allocated to a resource requester to be allocated for use by the resource requester. For example, the data may be provided to an apparatus (e.g., an apparatus that is part of, or separate from, the resource allocation system 120) that allows access to the allocated computing resources based on the data.

Figure 4:
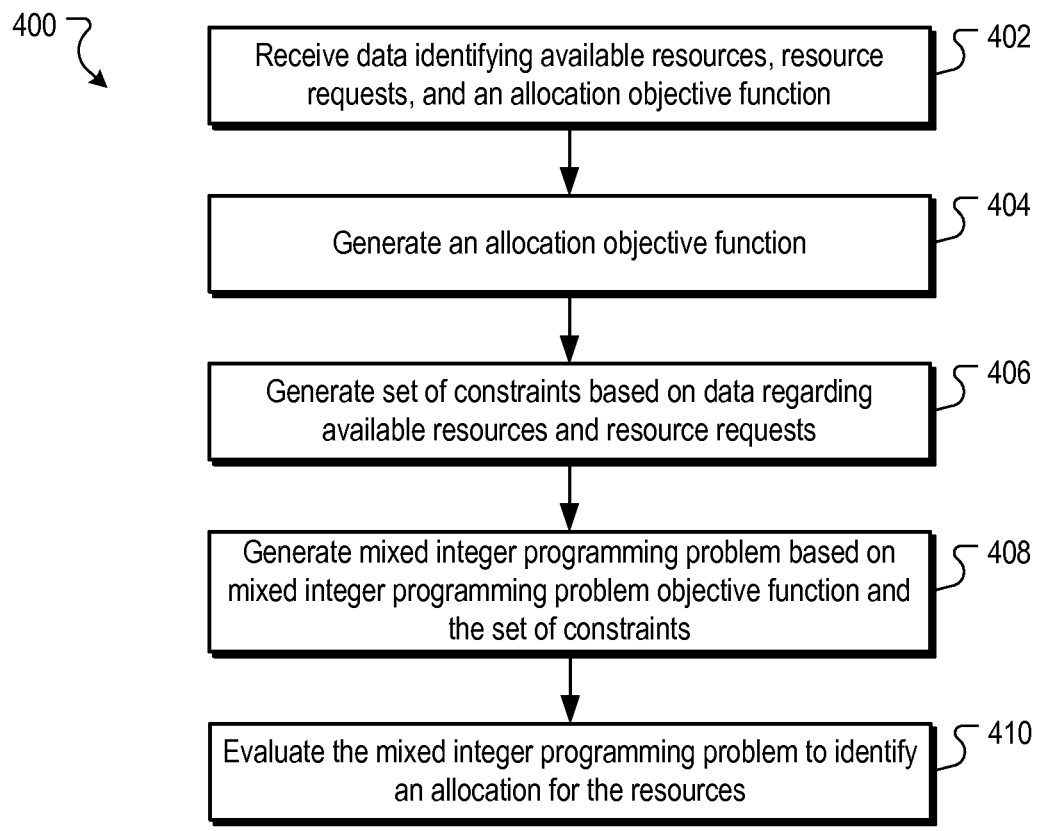
FIG. 4 is a flow chart of an example process for allocating resources using a mixed integer programming problem.

FIG. 4 is a flow chart of an example process for allocating resources using a mixed integer programming problem. Operations of the process 400 can be implemented, for example, by a data processing apparatus, such as the resource allocation system 120 of FIG. 1. The process 400 can also be implemented by instructions stored on computer storage medium, where execution of the instructions by a data processing apparatus cause the data processing apparatus to perform the operations of this process 400.

Data identifying available resources, resource requests, and an objective function are received (402). For example, the resource allocation system 120 can receive this data from resource providers 104, resource requesters 110, and an operator (or other entity), respectively, as described above with reference to FIG. 3.

The resource allocation system 120 generates an allocation objective function that specifies the objective and that includes variables that can be adjusted to achieve the objective based on the received data (404). The objective function may include variables for bid values, time periods, and resource quantities that can each be varied based on data specified in the resource statements and the request statements. For example, the bid values for a resource may be varied based on bid values specified in resource requests for that resource.

A set of constraints is generated based on the received data (406). The resource allocation system 120 can generate the set of constraints based on the data specified in the resource statements and the request statements. A subset of constraints can be generated for each available resource. For example, constraints for a particular available resource may include a time period in which the resource will be available, a maximum quantity of the resource available, and a minimum acceptable bid for the resource.

A subset of constraints can be generated for each bid for a resource. For example, the constraints for a bid for a resource can include a maximum bid value, a time period for which the resource is requested, a minimum and/or maximum quantity of the resource requested, interdependent conditions (e.g., only valid of another resource is allocated to the requester), and any geographic preferences for the resource. Another constraint is a budget for a resource requester 110. For example, if the resource requester specified a total budget that is not to be exceeded, the resource allocation system 120 may generate a constraint that prevents this budget from being exceeded.

The resource allocation system 120 generates a mixed integer programming problem based on the allocation objective function and the set of constraints (408). For example, the mixed integer programming problem may include the allocation objective function, variable values that can be entered into the allocation objective function (e.g., bid values, time periods, quantities, etc.) and the set of constraints.

The resource allocation system 120 evaluates the problem to identify an allocation of the resources that achieves the allocation objective and meets the constraints specified by the problem (410). To evaluate the problem, the resource allocation system 120 may substitute particular values for each variable, such as bid values for bids, into the objective function and determine which combination of bids provides a solution that meets the allocation objective within the confines of the constraints. For example, the resource allocation system 120 may evaluate many different combinations of bids for the available resources and different quantities for each bid (e.g., if the bid has an associated quantity range) and determine which of the combinations meets the allocation objective.

In some implementations, the resource allocation system 120 can iteratively create candidate resource allocations. After each iteration, each resource requester may be given the opportunity to adjust their bid or conditions associated with the bid. For example, the resource allocation system 120 may inform each resource requester of their candidate allocation at the end of an iteration. If the resource requester was not allocated a desired resource, the resource requester may increase the bid for the resource, increase their total budget, and/or relax any conditions placed upon the bid, such as a condition that another resource is allocated to the resource requester. After receiving the adjusted bids, the resource allocation system 120 can update the mixed integer programming problem and evaluate the updated problem to create a new candidate resource allocation.

In some implementations, the resource allocation system 120 can provide data to the resource requesters 110 that may help the requesters adjust their bids after an iteration, or after the completion of an auction. For example, the resource allocation system 120 may provide data that specify a suggested bid having a value that is likely to win allocation of a resource in the next iteration or in a subsequent auction. This suggested bid value may be determined based on the current winning bid value and/or data regarding past bidding information of competing requesters. For example, if a competing requester that is bidding on the same resource as a particular resource requester typically raises their bid by a particular percentage, this data may be used to determine a suggested bid value for the particular requester to submit in order to be competitive for the resource. In a multi-iteration auction, the resource requester can provide an updated bid for the computing resource that has a value that is based on the suggested bid. For example, the resource requester may increase its bid for the resource to the suggested bid value.

Figure 5:
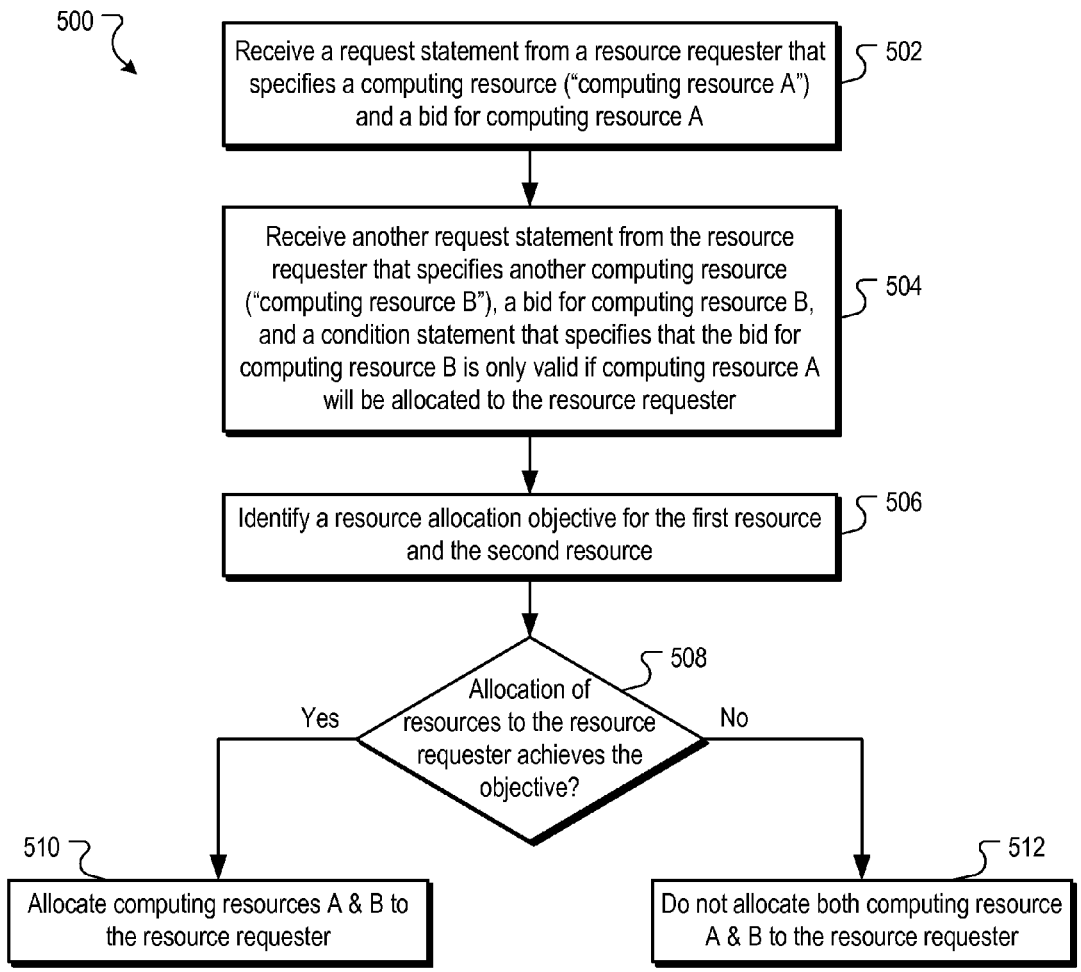
FIG. 5 is a flow chart of another example process for allocating resources.

FIG. 5 is a flow chart of another example process 500 for allocating resources. Operations of the process 500 can be implemented, for example, by a data processing apparatus, such as the resource allocation system 120 of FIG. 1. The process 500 can also be implemented by instructions stored on computer storage medium, where execution of the instructions by a data processing apparatus cause the data processing apparatus to perform the operations of this process 500.

A request statement, "request statement A," is received from a resource requester 110 (502). For example, the resource allocation system 120 of FIG. 1 can receive request statement A from the resource requester 110 by way of the network 102. Request statement A specifies computing resource A (e.g., a processor core) and a bid for the computing resource A. The bid for computing resource A specifies a value that the resource requester 110 is willing to pay to be allocated computing resource A.

A request statement, "request statement B," is received from the resource requester 110, for example by the resource allocation system 120 (504). Request statement B specifies computing resource B (e.g., computer-readable memory) and a bid for computing resource B. The bid for computing resource B specifies a value that the resource requester 110 is willing to pay to be allocated computing resource B. Request statement B also includes a condition statement that specifies that the bid for the computing resource B is only valid if the computing resource A will be allocated to the resource requester 110. For example, the resource requester 110 may not have use for computer-readable memory if the resource requester 110 is not allocated a processor core.

A resource allocation objective is identified (506). The resource allocation objective can specify an objective for allocating computing resources, such as computing resource A and computing resource B among resource requestors, including the resource requester 110. For example, the resource allocation objective may specify that the computing resources are to be allocated such that revenue is maximized.

A determination is made whether allocation of the computing resource A and computing resource B to the resource requester 110 will achieve the allocation objective (508). The resource allocation system 120 may make the determination based on a set of request statements that includes request statement A and request statement B. For example, if the allocation objective is to maximize revenue, the resource allocation system 120 may allocate the computing resources in a manner that maximizes revenue relative to other potential allocations of computing resource A and computing resource B. In this example, the resource allocation system 120 may determine that allocating computing resource A and computing resource B to the resource requester 110 results in the highest amount of revenue among possible allocations of computing resource A and computing resource B.

Other outcomes are also possible based on the condition statement of request statement B. For example, the resource allocation system 120 may determine that allocation of resource A to the resource requester 110 while not allocating resource B to the resource requester 110 achieves the allocation objective. In this example, the resource requester 110 may be allocated resource A, but not resource B. Or, the resource allocation system 120 may determine that neither allocation of resource A nor resource B to the resource requester 110 achieves the allocation objective. In this example, the resource requester 110 may not be allocated either resource A or resource B.

As described above, the determination can be performed by the resource allocation system 120, which may generate and evaluate a mixed integer programming problem based on data regarding available resources, request statements, and an allocation objective. The resource allocation system 120 may generate a mixed integer programming problem based on a set of available computing resources that includes computing resource A and computing resource B, the request statements that include request statement A and request statement B, and the identified allocation objective. The available resources may be identified (and later provided) by multiple resource providers. Similarly, request statements may include request statements received from the resource requester 110 and other resource requesters.

The mixed integer programming problem may include a set of constraints. This set of constraints can include the condition that the bid for the computing resource B is only valid if the computing resource A will be allocated to the resource requestor 110. The set of constraints can also include constraints based on condition statements included in other request statements received from the resource requester 110 and/or constraints based on condition statements included in request statements received from other resource requesters.

The resource requester 110 may also provide a budget constraint that specifies a maximum total amount the resource requester 110 is willing to pay for computing resources. In determining whether allocation of the computing resource A and computing resource B to the resource requester 110 will achieve the allocation objective, the resource allocation system 120 can determine whether this allocation will be at a price that is within the budget constraint and will meet the resource allocation objective. For example, if the total price for computing resource A and computing resource B exceeds the budget constraint, computing resource A and/or computing resource B may not be allocated to the resource requester 110.

The resource requester 110 may also provide a range of quantities of one or both of the computing resources. For example, the resource requester 110 may provide a total quantity of computing resource A that the resource requestor 110 is requesting and a minimum quantity of computing resource A that the resource requestor will accept based on the bid for computing resource A. In determining that allocation of computing resource A and computing resource B to the resource requester 110 will achieve the allocation objective, the resource allocation system 120 may determine that allocation of at least the minimum quantity of the computing resource A and allocation of computing resource B will achieve the resource allocation objective. For example, if the resource allocation system 120 determine that a quantity less than the minimum quantity of computing resource A will meet the resource objective rather than a quantity that meets or exceeds the minimum quantity, the resource allocation system 120 may determine that allocation of computing resource A to the resource requester 110 does not meet the allocation objective. In response, the resource allocation system 120 may not allocate the computing resource A to the resource requester 110. Due to the condition statement of request statement B, the resource allocation system 120 may not allocate computing resource B to the resource requester 110 as computing resource A was not allocated to the resource requester 110.

When a determination is made that allocation of the computing resource A and computing resource B to the resource requester 110 will achieve the allocation objective, computing resource A and computing resource B are allocated to the resource requester (510). For example, the resource allocation system 120 may provide data that specify the allocation and the price for the computing resources, to the resource requester 110 and to the resource provider(s) that are providing the computing resources.

When a determination is made that allocation of the computing resource A and computing resource B to the resource requester 110 will not achieve the allocation objective, at least one of computing resource A and computing resource B is not allocated to the resource requester 110 (512). The resource allocation system 120 may determine a resource allocation that meets the allocation objective and that allocates computing resource A to the resource requester 110 while not allocating computing resource B to the resource requester 110. In this example, computing resource A may be allocated to the resource requester 110.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving, from a resource requester, a first request statement specifying:
      a first computing resource;
      a first bid for the first computing resource, the first bid specifying a first value the resource requester is willing to pay to be allocated the first computing resource;
      a total quantity of the first computing resource requested by the resource requester; and
      a minimum quantity of the first computing resource the resource requester is willing to accept;
   receiving, from the resource requester, a second request statement specifying a second computing resource different from the first computing resource and a second bid for the second computing resource, the second bid specifying a second value the resource requester is willing to pay to be allocated the second computing resource, the second request statement including a condition statement specifying that the second bid is only valid if the first computing resource will be allocated to the resource requester;
   identifying a resource allocation objective for allocation of the first computing resource and the second computing resource among a plurality of resource requesters, wherein the resource allocation objective includes one of increasing revenue from bid values included in a set of request statements that includes the first request statement and the second request statement, reducing a number of rejected request statements, or increasing a number of resources allocated;
   determining, based on the set of request statements that includes the first request statement and the second request statement, that allocation of the second computing resource and at least the minimum quantity of the first computing resource to the resource requester will achieve the resource allocation objective, the determining including:
  generating a mixed integer programming problem that includes a set of constraints, the set of constraints including constraints generated based on condition statements included in the set of request statements, including the condition statement specifying that the second bid is only valid if the first computing resource will be allocated to the resource requester; and
  identifying, by evaluating the mixed integer programming problem, a resource allocation in which the resource allocation objective is achieved and each constraint of the set of constraints is satisfied; and
in response to the determination, providing data that causes the first computing resource and the second computing resource to be allocated for use by the resource requester.

2. The method of claim 1, further comprising receiving, from the resource requester, a budget constraint specifying a maximum total amount the resource requester is willing to pay for computing resources, wherein determining that allocation of the first computing resource and the second computing resource to the resource requester will achieve the resource allocation objective comprises determining that allocation of the first computing resource and the second computing resource at a price that is within the budget constraint will achieve the resource allocation objective.

3. The method of claim 1, wherein the first value specifies a premium value above a listed price for the first computing resource.

4. The method of claim 1, further comprising:
  providing, to the resource requester, data specifying a suggested bid for the first computing resource, the suggested bid specifying a suggested value for the resource requester to provide in a subsequent bid for the first computing resource; and
  receiving, from the resource requester, an updated bid for the first computing resource, the updated bid having an updated value that is based on the suggested bid.

5. The method of claim 1, wherein the second request statement includes a second condition statement that specifies that the second bid is only valid if a portion of a group of resources will be allocated to the resource requester.

6. The method of claim 1, wherein the first request statement is different from the second request statement and the second computing resource will be used separately from the first computing resource.

7. The method of claim 1, further comprising receiving a third request statement from the resource requester, the third request statement specifying a third computing resource and a third bid for the third computing resource, the third request statement including a second condition statement specifying that the third bid is only valid if the first computing resource will not be allocated to the resource requester.

8. A system, comprising:
  a data store for storing request statements received from resource requesters and resource allocation objectives; and
  one or more processors configured to interact with the data store, the one or more processors being further configured to perform operations comprising:
    receiving, from a resource requester, a first request statement specifying:
      a first computing resource;
      a first bid for the first computing resource, the first bid specifying a first value the resource requester is willing to pay to be allocated the first computing resource;
      a total quantity of the first computing resource requested by the resource requester; and
      a minimum quantity of the first computing resource the resource requester is willing to accept;
    receiving, from the resource requester, a second request statement specifying a second computing resource different from the first computing resource and a second bid for the second computing resource, the second bid specifying a second value the resource requester is willing to pay to be allocated the second computing resource, the second request statement including a condition statement specifying that the second bid is only valid if the first computing resource will be allocated to the resource requester;
    identifying, from the data store, a resource allocation objective for allocation of the first computing resource and the second computing resource among a plurality of resource requesters, wherein the resource allocation objective includes one of increasing revenue from bid values included in a set of request statements that includes the first request statement and the second request statement, reducing a number of rejected request statements, or increasing a number of resources allocated;
    determining, based on the set of request statements that includes the first request statement and the second request statement, that allocation of the second computing resource and at least the minimum quantity of the first computing resource to the resource requester will achieve the resource allocation objective, the determining including:
      generating a mixed integer programming problem that includes a set of constraints, the set of constraints including constraints generated based on condition statements included in the set of request statements, including the condition statement specifying that the second bid is only valid if the first computing resource will be allocated to the resource requester; and
      identifying, by evaluating the mixed integer programming problem, a resource allocation in which the resource allocation objective is achieved and each constraint of the set of constraints is satisfied; and
    in response to the determination, providing data that causes the first computing resource and the second computing resource to be allocated for use by the resource requester.

9. The system of claim 8, wherein the one or more processors are further configured to receive, from the resource requester, a budget constraint specifying a maximum total amount the resource requester is willing to pay for computing resources, wherein determining that allocation of the first computing resource and the second computing resource to the resource requester will achieve the resource allocation objective comprises determining that allocation of the first computing resource and the second computing resource at a price that is within the budget constraint will achieve the resource allocation objective.

10. The system of claim 8, wherein the first value specifies a premium value above a listed price for the first computing resource.

11. The system of claim 8, wherein the one or more processors are further configured to:
provide, to the resource requester, data specifying a suggested bid for the first computing resource, the suggested bid specifying a suggested value for the resource requester to provide in a subsequent bid for the first computing resource; and
receive, from the resource requester, an updated bid for the first computing resource, the updated bid having an updated value that is based on the suggested bid.

12. The system of claim 8, wherein the second request statement includes a second condition statement that specifies that the second bid is only valid if a portion of a group of resources will be allocated to the resource requester.

13. A computer storage medium encoded with a computer program, the program comprising instructions that when executed by data processing apparatus cause the data processing apparatus to perform operations comprising:
receiving, from a resource requester, a first request statement specifying:
a first computing resource;
a first bid for the first computing resource, the first bid specifying a first value the resource requester is willing to pay to be allocated the first computing resource;
a total quantity of the first computing resource requested by the resource requester; and
a minimum quantity of the first computing resource the resource requester is willing to accept;
receiving, from the resource requester, a second request statement specifying a second computing resource different from the first computing resource and a second bid for the second computing resource, the second bid specifying a second value the resource requester is willing to pay to be allocated the second computing resource, the second request statement including a condition statement specifying that the second bid is only valid if the first computing resource will be allocated to the resource requester;
identifying a resource allocation objective for allocation of the first computing resource and the second computing resource among a plurality of resource requesters, wherein the resource allocation objective includes one of increasing revenue from bid values included in a set of request statements that includes the first request statement and the second request statement, reducing a number of rejected request statements, or increasing a number of resources allocated;
determining, based on the set of request statements that includes the first request statement and the second request statement, that allocation of the second computing resource and at least the minimum quantity of the first computing resource to the resource requester will achieve the resource allocation objective, the determining including:
generating a mixed integer programming problem that includes a set of constraints, the set of constraints including constraints generated based on condition statements included in the set of request statements, including the condition statement specifying that the second bid is only valid if the first computing resource will be allocated to the resource requester; and
identifying, by evaluating the mixed integer programming problem, a resource allocation in which the resource allocation objective is achieved and each constraint of the set of constraints is satisfied; and
in response to the determination, providing data that causes the first computing resource and the second computing resource to be allocated for use by the resource requester.

14. The computer storage medium of claim 13, wherein the instructions cause the data processing apparatus to receive, from the resource requester, a budget constraint specifying a maximum total amount the resource requester is willing to pay for computing resources, wherein determining that allocation of the first computing resource and the second computing resource to the resource requester will achieve the resource allocation objective comprises determining that allocation of the first computing resource and the second computing resource at a price that is within the budget constraint will achieve the resource allocation objective.

15. The computer storage medium of claim 13, wherein the first value of the first bid specifies a premium value that is above a listed price for the first computing resource.

16. The computer storage medium of claim 13, wherein the instructions cause the data processing apparatus to perform further operations comprising:
providing, to the resource requester, data specifying a suggested bid for the first computing resource, the suggested bid specifying a suggested value for the resource requester to provide in a subsequent bid for the first computing resource; and
receiving, from the resource requester, an updated bid for the first computing resource, the updated bid having an updated value that is based on the suggested bid.

17. The computer storage medium of claim 13, wherein the second request statement includes a second condition statement that specifies that the second bid is only valid if a portion of a group of resources will be allocated to the resource requester.

* * * * *